United States Patent
Nakayama et al.

(10) Patent No.: US 9,222,749 B1
(45) Date of Patent: Dec. 29, 2015

(54) COVER KIT FOR A FIREARM HANDGUARD

(71) Applicant: Magpul Industries Corp., Boulder, CO (US)

(72) Inventors: Brian L. Nakayama, Arvada, CO (US); Christopher F. Miller, Erie, CO (US); Michael T. Mayberry, Denver, CO (US); Nicholas Kielsmeier, Denver, CO (US); Richard M. Fitzpatrick, Longmont, CO (US)

(73) Assignee: MAGPUL INDUSTRIES, CORP., Louisville, CO (US)

( * ) Notice: Subject to any disclaimer, the term of this patent is extended or adjusted under 35 U.S.C. 154(b) by 0 days.

(21) Appl. No.: 14/559,407

(22) Filed: Dec. 3, 2014

(51) Int. Cl.
*F41C 23/16* (2006.01)
*F16B 19/10* (2006.01)

(52) U.S. Cl.
CPC .............. *F41C 23/16* (2013.01); *F16B 19/1081* (2013.01); *Y10T 24/45262* (2015.01)

(58) Field of Classification Search
CPC ....... F41C 23/16; F41G 11/003; F41A 35/02; F16B 19/1081; Y10T 24/30; Y10T 24/45262
USPC ....................................................... 42/96, 85
See application file for complete search history.

(56) References Cited

U.S. PATENT DOCUMENTS

| | | | |
|---|---|---|---|
| 6,481,942 B2 * | 11/2002 | Tanaka | 411/45 |
| D625,378 S | 10/2010 | Fitzpatrick et al. | |
| 7,823,319 B2 * | 11/2010 | Casas Salva | 42/96 |
| 7,856,749 B2 | 12/2010 | Fitzpatrick et al. | |
| D636,836 S | 4/2011 | Fitzpatrick et al. | |
| 7,971,383 B2 | 7/2011 | Fitzpatrick et al. | |
| D667,917 S | 9/2012 | Fitzpatrick et al. | |
| D668,731 S | 10/2012 | Fitzpatrick et al. | |
| D670,785 S | 11/2012 | Fitzpatrick et al. | |
| D676,920 S | 2/2013 | Fitzpatrick et al. | |
| D691,235 S | 10/2013 | Fitzpatrick et al. | |
| D691,236 S | 10/2013 | Fitzpatrick et al. | |
| D704,789 S | 5/2014 | Fitzpatrick et al. | |
| D704,791 S | 5/2014 | Fitzpatrick et al. | |
| 8,752,320 B2 * | 6/2014 | Masters | 42/71.01 |
| D710,965 S | 8/2014 | Eitan et al. | |
| 8,935,874 B2 * | 1/2015 | Troy | 42/90 |
| 9,004,415 B2 * | 4/2015 | Fukumoto | 248/71 |

(Continued)

OTHER PUBLICATIONS

Larue Tactical, "ERGO Grips Textured Rail Covers", known to exist prior to at least Jan. 4, 2015, Webpage found at http://www.laruetactical.com/ergo-grips-textured-rail-covers downloaded on Jan. 4, 2015, Published in: US.

(Continued)

*Primary Examiner* — Troy Chambers
*Assistant Examiner* — Joshua Semick
(74) *Attorney, Agent, or Firm* — Neugeboren O'Dowd PC

(57) ABSTRACT

A system and method for a user's appendages when firing a weapon is described. One embodiment includes a cover kit for a firearm handguard. The kit has a base and an insert. The base has a longitudinal axis, an upright axis, a transverse axis, a socket, an exterior surface, and an interior surface. The insert has an insert body and a plug. The socket has a movable engagement prong shaped to engage a wall surface of a handguard slot. The plug has a prong engagement surface shaped to engage the engagement prong. The plug is shaped to apply a force on the engagement prong such that a distal portion of the engagement prong is flexed more than a proximal portion of the engagement prong.

23 Claims, 13 Drawing Sheets

(56) References Cited

U.S. PATENT DOCUMENTS

| 9,086,084 | B2* | 7/2015 | Watanabe | |
| 2014/0325889 | A1* | 11/2014 | Michal et al. | 42/75.01 |
| 2014/0341674 | A1* | 11/2014 | Hirano | 411/80.1 |

OTHER PUBLICATIONS

Larue Tactical, "IndexClips, 72 Piece Set", known to exist prior to at least Jan. 4, 2015 Webpage found at http://www.laruetactical.com/indexclips-72-piece-set downloaded on Jan. 14, 2015, Published in: US.

Noveske, "Polymer Accessory Pack", known to exist prior to at least Jan. 4, 2015, Webpage found at http://www.shopnoveske.com/collections/parts/products/polymer-accessory-pack downloaded on Jan. 14, 2015, p. 2 Published in: US.

Tangodown, "TangoDown BattleGrip BG-16", known to exist prior to at least Jan. 4, 2015, Webpage found at http://tangodown.com/shop/tangodown-battlegrip-bg-16/ downloaded on Jan. 14, 2015, p. 4 Publisher: TangoDown, Inc., Published in: US.

Troy Industries, "Rail Cover Kit, 12 Piece-BLK", known to exist prior to at least Jan. 4, 2015, Webpage found at http://troyind.com/rail-cover-12-piece-blk downloaded on Jan. 14, 2015, p. 2 Published in: US.

* cited by examiner

COVER KIT FOR A FIREARM HANDGUARD

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to firearms. In particular, but not by way of limitation, the present invention relates to systems and methods for protecting a user's appendages during firing of a weapon.

BACKGROUND OF THE INVENTION

Firearms, particularly those providing for fast repeating firing action, often include handguards. The handguards typically provide for protection from dangerous areas of the weapon, as well as an improved grip and heat dissipation from the barrel of the weapon while also providing slots and/or rails for mounting accessories to the weapon. The handguards, despite allowing for some heat dissipation, may be unable to shield the user from heat radiating from the weapon, and, in the case of polymeric handguards, melting. Currently-available handguards may dissipate heat; however, it is desirable to do so only in areas that the user does not contact.

Accordingly, a system and method are needed to address these shortfalls and/or to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One embodiment includes a cover kit for a firearm handguard. The kit has a base and an insert. The base has a longitudinal axis, an upright axis, a transverse axis, a socket, an exterior surface, and an interior surface. The insert has an insert body and a plug. The socket has a movable engagement prong shaped to engage a wall surface of a handguard slot. The plug has a prong engagement surface shaped to engage the engagement prong. The plug is shaped to apply a force on the engagement prong such that a distal portion of the engagement prong is flexed more than a proximal portion of the engagement prong.

In another embodiment, a method of protecting a user's appendages when firing a weapon is provided. The method includes providing a weapon handguard and a cover kit. The cover kit has a base and an insert, and the base has a longitudinal axis, an upright axis, a transverse axis, and a socket having an engagement prong. The insert has a plug, and is made of a material that is as flexible as the base or less flexible than the base. The method further includes attaching the base to a handguard by inserting the engagement prong into a slot of the handguard, and inserting the plug into the socket. Inserting the plug causes the plug to preclude the engagement prong from disengaging from the slot, and thereby prevents removal of the cover kit from the handguard until the plug is removed from the socket.

In another embodiment, a cover assembly for a firearm handguard is provided. The assembly has a primary cover having a free configuration and a handguard engagement configuration and an adjustment cover. The handguard configuration of the primary cover comprises engagement with at least two opposing wall surfaces of a handguard slot and an exterior surface of the handguard. The primary cover is shaped to cover at least a portion of an external surface of a handguard. The adjustment cover is made of a material that is as flexible as the primary cover or less flexible than the primary cover, and is shaped to nestle within the primary cover and cause the primary cover to prevent the cover assembly from disengaging from a handguard.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

A more complete understanding of the teachings of the present disclosure is apparent and more readily appreciated by reference to the following Detailed Description and to the appended claims when taken in conjunction with the accompanying Drawings wherein:

DETAILED DESCRIPTION

Before providing a detailed description of aspects of the inventive concepts disclosed herein, it is expedient to describe the nature of various embodiments generally. Specifically, some embodiments provide a method and apparatus to cover a handguard of a weapon, and thereby protect a user from injury due to contact with a hot weapon or to enhance grip on a weapon's fore end. Some embodiments may serve to protect the weapon itself, particularly where machined Picatinny rails or other machined surfaces are used. Some embodiments may be used in a decorative fashion and/or to create a type of camouflage.

Figure 1:
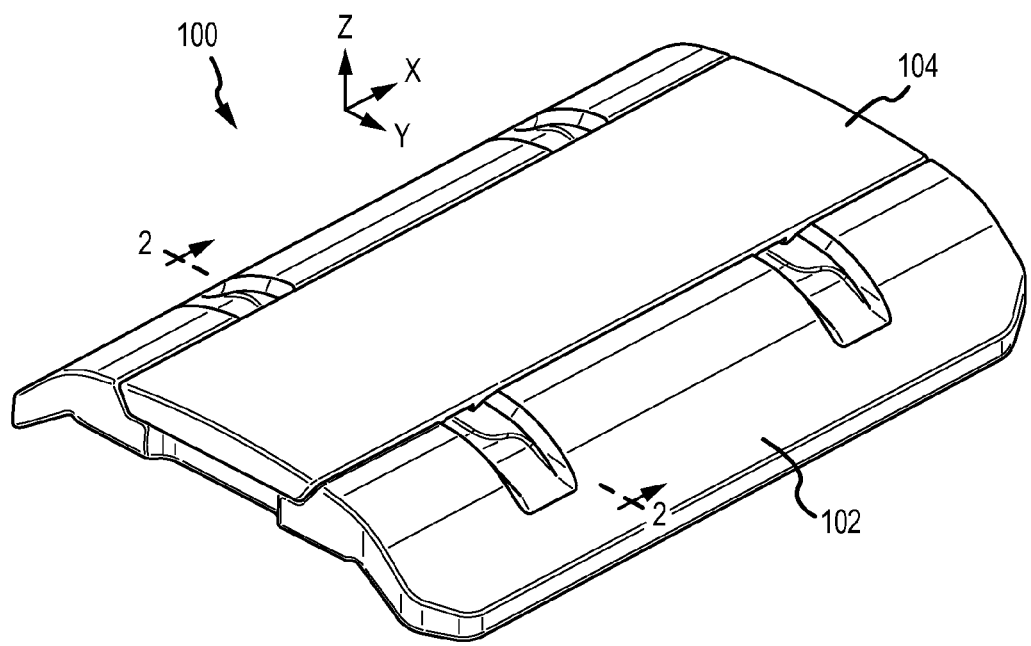
FIG. 1 is an isometric view of a cover kit according to an embodiment.

As shown generally in FIG. 1, some embodiments may be a cover assembly having a primary cover and an adjustment cover. The primary cover can be inserted into a slot in a firearm, for instance one of a plurality of slots in a firearm's fore end, and then the adjustment cover or plug can be inserted into a socket in the primary cover to lock the combined components into the slot of the firearm. In this way, the present disclosure provides an accessory attachment interface that achieves repeatable and strong coupling to a weapon without the need for any tools. The primary cover has a free configuration and a handguard engagement configuration, the handguard configuration comprising engagement with at least two opposing wall surfaces of a handguard slot and an exterior surface of the handguard. The primary cover is shaped to cover at least a portion of an external surface of a handguard, while the adjustment cover is made of a material that is equally flexible or less flexible than the primary cover; and nestles within the primary cover to cause the primary cover to maintain the handguard engagement configuration. For the purpose of this disclosure, the term "nestle" shall be understood to mean "to lie close or be situated in a half-hidden or obscured position."

Continuing now with FIG. 1, shown is a cover kit 100 for a firearm handguard. The kit 100 has a base 102 and an insert 104. To provide a point of reference, components of the kit 100 have a longitudinal axis X, a transverse axis Y, and an upright or vertical axis Z. The longitudinal axis X may be associated with a firing direction of a weapon.

For the purpose of this document, the following definitions shall apply. Unless otherwise indicated, the terms "exterior", "proximal", or "top" shall reference those features or directions associated with an outer region of a weapon, or a weapon handguard, or regions which may be gripped when the cover kit 100 is assembled on a weapon, while the term "interior", "distal" or "bottom" shall reference those features or directions associated with an interior region of a weapon handguard. For example, in FIG. 4, a top view of the base 102 is illustrated, and the proximal exterior surface of the base 102 is in view. Similarly, in FIG. 8, the plug lead-in 1042a is associated with a bottom, distal, or interior region of the insert 104.

Moreover, throughout this disclosure, various terms used to describe placement or relationships between components shall be understood to mean "within reasonable manufacturing tolerances". As just one example, the term "perpendicular" shall mean "perpendicular to within reasonable manufacturing tolerances".

Figure 2:
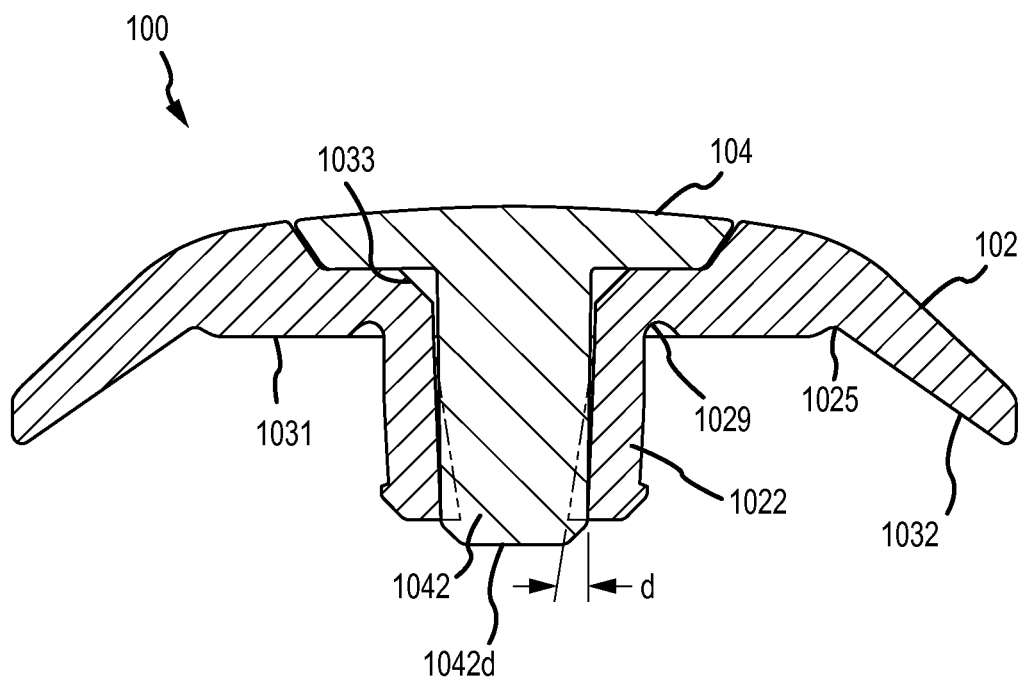
FIG. 2 is a section view of the cover kit in FIG. 1.
Figure 3:
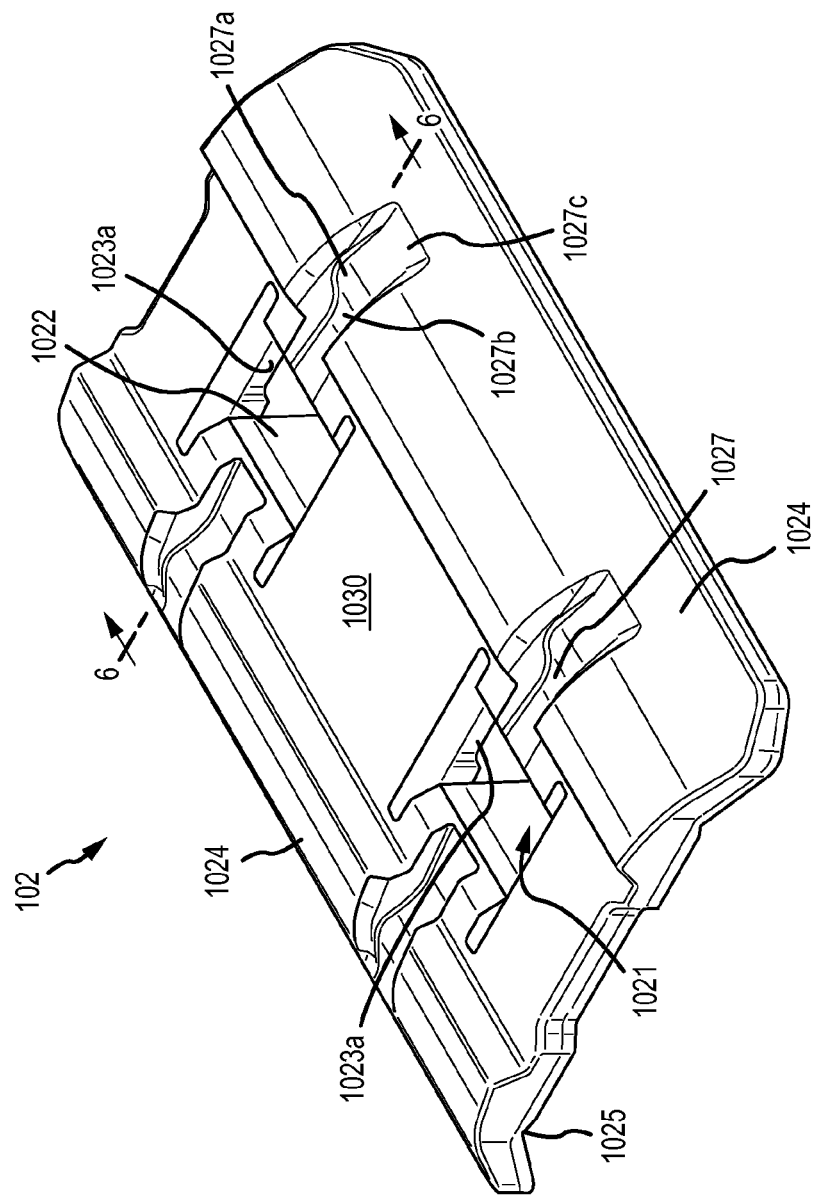
FIG. 3 is an isometric view of a base according to an embodiment.

Referencing now FIGS. 2-6, the base 102 is described in further detail. The base 102 has a socket 1021, an engagement prong 1022 that is movable relative to a main body 1024 of the base 102, and an exterior surface having a longitudinal recess 1030, as seen most clearly in FIGS. 2 and 3. In some embodiments, the base 102 is made of a flexible resilient material. The main body 1024, as shown in FIG. 3, is that portion of the base 102 that does not protrude into the handguard.

The socket 1021 is provided to engage a slot of a handguard while accepting plug 1042 to secure a stable engagement. Specifically, the socket 1021 may provide a locating function and loose engagement with the slot prior to insertion of a plug 1042 for a secure engagement. The manner of engagement with a handguard is most clearly seen in FIGS. 2A-2C. As seen in FIGS. 2A-2C, for example, the socket 1021 may have a socket ledge 1023 (FIG. 2C) projecting inwardly of the base 102 to limit longitudinal movement of the base 102 relative to the slot. The socket ledge 1023 may be curved at an outer portion, to limit longitudinal and transverse movement of the base 102 relative to the slot. The socket ledge 1023 may be shaped with a maximum tolerance that ensures there is no interference fit between the socket ledge 1023 and the slot. See, for example, FIG. 2C, showing a separation distance D between the socket ledge 1023 and the slot. In some embodiments, the socket ledge 1023 is shaped to engage a curved wall surface of the handguard slot (see e.g. FIG. 5). Moreover, the socket ledge 1023 may provide for a socket recess 1023a between the plug 104 and the socket ledge 1023, as seen in FIG. 2C, when the cover kit 100 is assembled.

In some embodiments, the base 102 has a plurality of handguard abutting surfaces 1031, 1032 that may be movable relative to one another. In some embodiments, a majority of a first handguard abutting surface 1031, after assembly of the cover kit 100 to a handguard, is shaped to remain in contact with or in a fixed position relative to the handguard, while a second and/or subsequent handguard abutting surfaces 1032 may contact the handguard if intentionally flexed towards the handguard. In other embodiments, a second and/or subsequent handguard abutting surface 1032 may fully or partially remain in contact with the handguard when assembled. See, for example, FIG. 2B, showing a separation between second and third handguard abutting surfaces 1032 and the handguard. Biasing some or a majority of the handguard abutting surfaces 1032 away from the handguard allows for more optimized heat dissipation from the weapon. Specifically, by abutting some portion, but not the entirety of the handguard abutting surfaces 1032, heat may be directed towards areas not covered, thus allowing the user to direct heat towards areas the user does not grip.

This configuration also allows for compatibility with a variety of differently sized handguards. For one non-limiting example, it should be understood that, although FIG. 2B depicts the handguard as having a plurality of distinct surfaces which may be abutted by the plurality of handguard abutting surfaces 1031, 1032, the plurality of handguard abutting surfaces 1031, 1032 may be shaped to abut distinct portions of a single handguard surface, such as where the external surface of the handguard is generally cylindrical.

Continuing now with FIG. 2B, engagement between the cover kit 100 and the handguard slot is shown in detail. As seen, the engagement prong 1022 is shaped to engage a wall surface of a handguard slot, and has a prong flange 1022b shaped to engage an interior surface of the handguard. The prong flange 1022b is not necessarily in constant engagement with the interior surface of the handguard upon assembly. Instead, the prong flange 1022b may be provided such that engagement with the interior surface of the handguard only occurs if the base 102 is beginning to disengage from the slot. That is, the prong flange 1022b may have a limited purpose of loosely maintaining the base 102 assembled to the slot, to prevent loss of the base and/or to maintain a general location of the base 102 relative to the slot prior to insertion of the insert 104.

Figure 4:
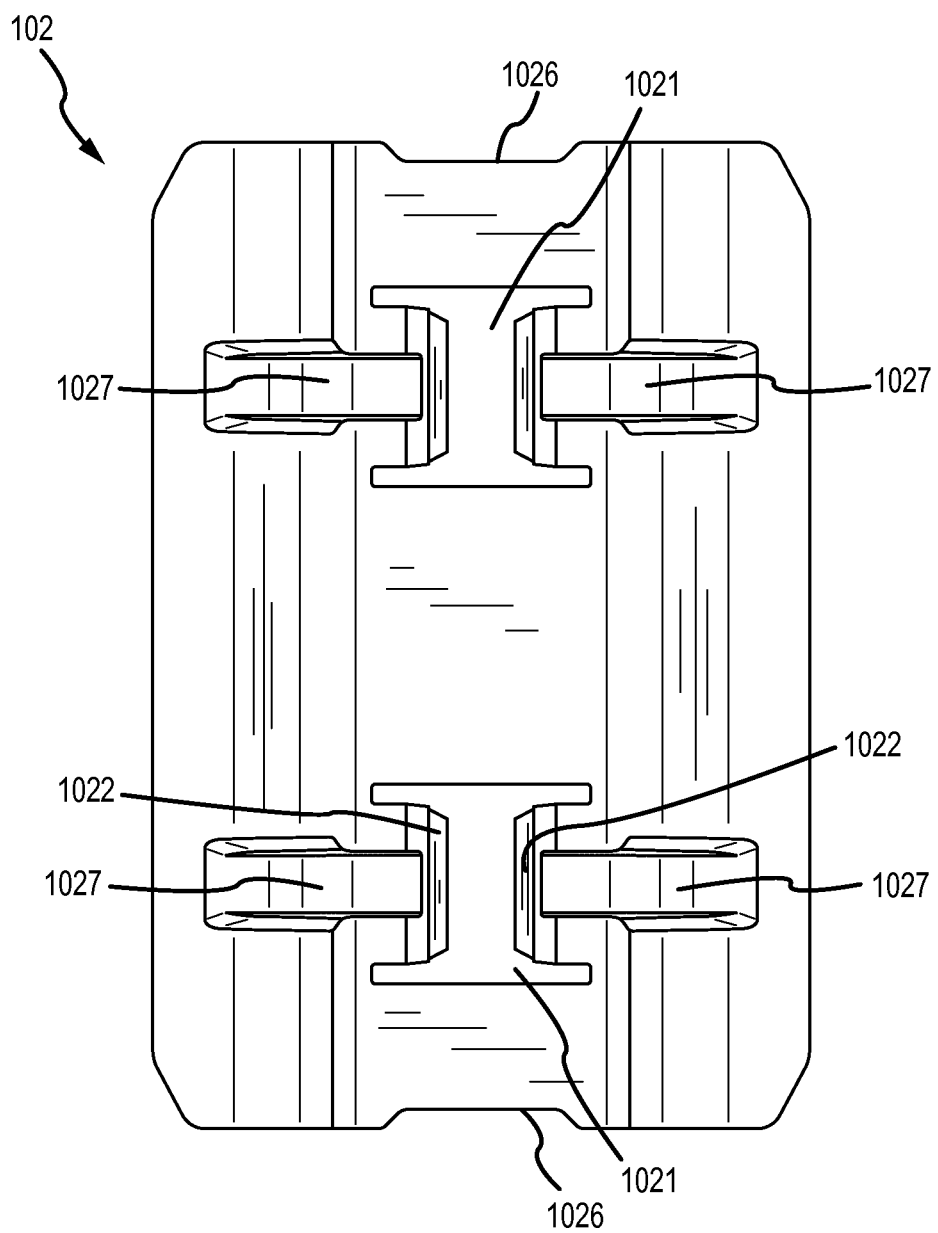
FIG. 4 is a top view of a base according to an embodiment.
Figure 5:
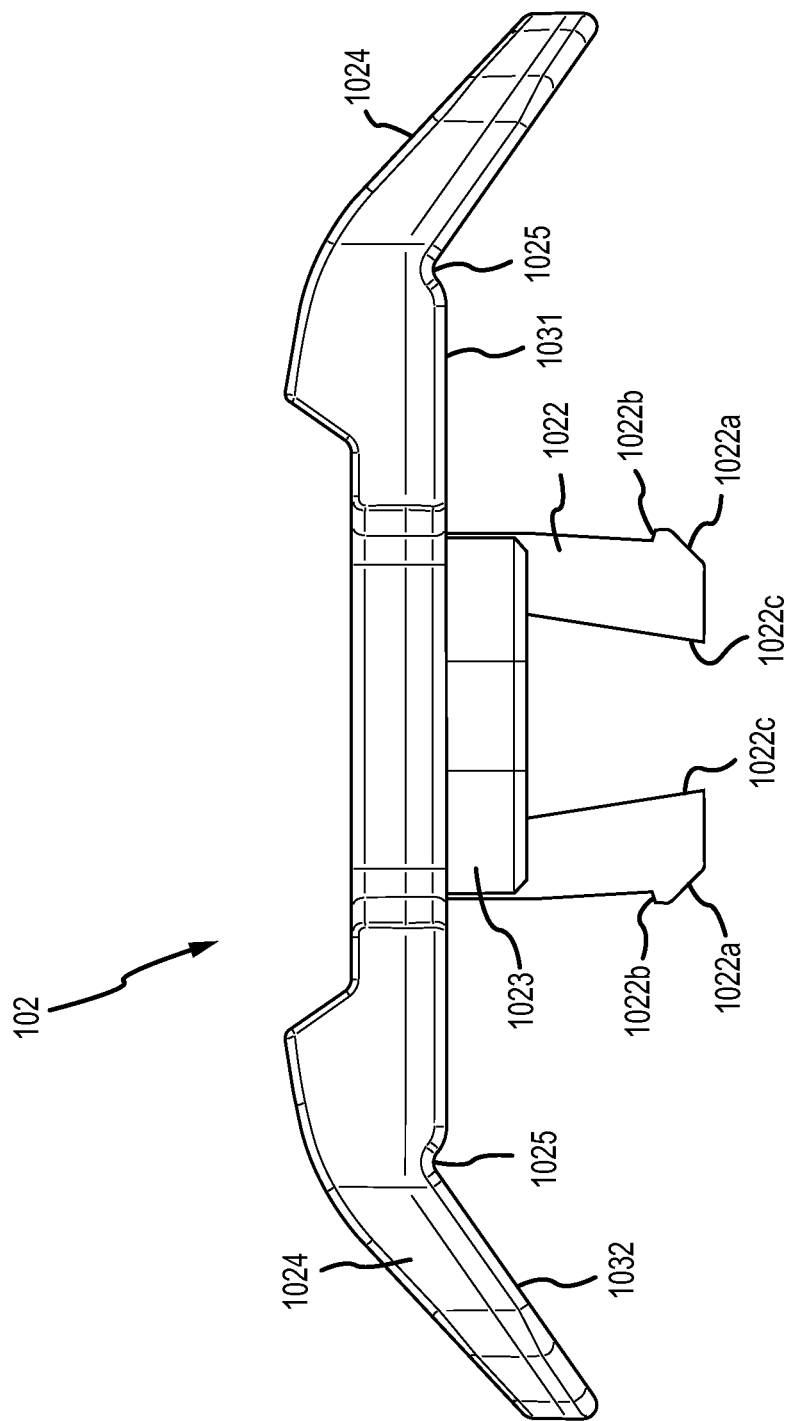
FIG. 5 is a front view of a base according to an embodiment.

Turning now to FIGS. 3-5, various features of the base 102 are discussed in further detail. In some embodiments, the base 102 is a unitary base made of a material that is equally flexible or more flexible than the insert 104, with a plurality of handguard abutting surfaces 1031, 1032. The plurality of handguard abutting surfaces 1031, 1032 may include a first handguard abutting surface 1031 in a transverse plane, a second handguard abutting surface 1032 angled relative to the first handguard abutting surface, and a third handguard abutting surface 1032 opposing the second handguard abutting surface 1032. Notched material regions 1025 may join the second and third handguard abutting surfaces 1032 to the first handguard abutting surface 1031. It should be understood that, although the plurality of handguard abutting surfaces 1031, 1032 are depicted as flat surfaces, any shaped surfaces suitable for abutting a firearm handguard and/or maintaining a fixed distance from a handguard may be provided in a handguard cover kit 100.

In some embodiments, and as seen in FIG. 3, the base 102 has a recess 1027 which may be a leverage recess to enable the insert 104 to be removed from the base 102 while the cover kit 100 is assembled on a weapon. Specifically, the recess 1027, where provided, is shaped to provide a gap di (see FIG. 6) between a portion of the exterior surface of the base 102 and a portion of an interior surface of the insert body 1041 when the base 102 and the insert 104 are assembled. At least a portion of the gap di may be upright of the engagement prong 1022. The recess 1027 may be shaped to allow a removal tool to be inserted into the gap di. For example, the recess 1027 may include a support 1027a with an inner recess 1027b and an outer recess 1027c providing a gap di for a removal tool to rotate about the support 1027a. A removal tool thus applies an inwardly projecting force on the support 1027a to apply an outward or removal force on an assembled insert 104 (see e.g. FIGS. 1 and 2A).

In some embodiments, the gap dl and/or the recess 1027 may be shaped to allow for an improvised tool, such as a firearm cartridge tip, to be used as a removal tool. In these embodiments, the support 1027a allows the improvised tool to wedge into the gap dl and apply a separation force to remove the insert 104. In some embodiments, the support 1027a may act as a fulcrum to allow a removal tool or an improvised tool to pivot about the support 1027a to apply the separation force. That is, the separation force may be achieved through a pivot motion in some embodiments, or the separation force may be achieved through a wedging motion in some embodiments.

As seen most clearly in FIG. 5, the engagement prong 1022 may include a prong lead-in 1022a to facilitate locating for installation of the base on a handguard of a weapon. The plug engagement wall 1022c may be angled such that, as the plug 1042 is inserted into the socket 1021, the distal portion of the engagement prong 1022 is pushed further away from a center of the socket 1021 than the proximal portion of the engagement prong 1022.

Figure 6:
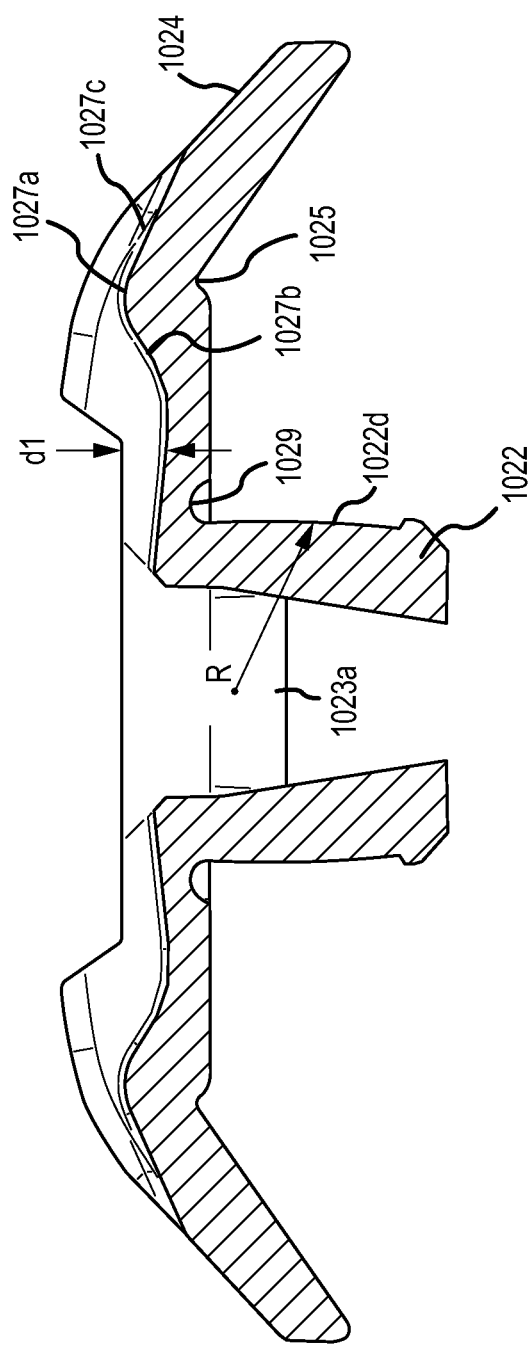
FIG. 6 is a section view of the base in FIG. 3.

As most clearly seen in FIG. 6, the engagement prong 1022 may include a curved handguard engagement surface 1022d having a radius R, such that a distal portion of the engagement prong 1022 is thinner than a proximal portion of the engagement prong 1022 to facility flexing of the engagement prong 1022. Although a radius R is depicted, it should be understood that any manner of providing the engagement prong 1022 with a thinner distal portion is suitable.

In some embodiments, a notched material region 1029 is provided to join the engagement prong 1022 to a body 1024 of the base 102 (see e.g. FIG. 6). This notched material region 1029 allows the engagement prong 1022 to more smoothly move or flex relative to the rest of the base 102 when the plug 1042 is inserted.

Turning now to FIG. 4, the base 102 may further include end recesses 1026 to facilitate removal of the insert 104 from the base 102.

Figure 7:
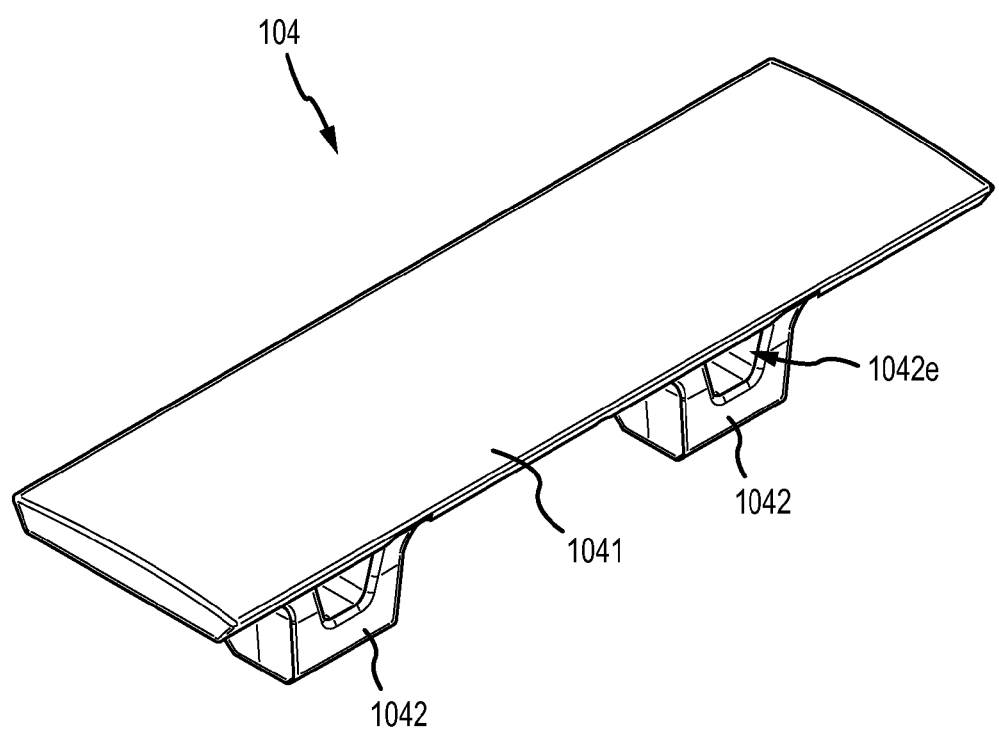
FIG. 7 is an isometric view of an insert according to an embodiment.
Figure 8:
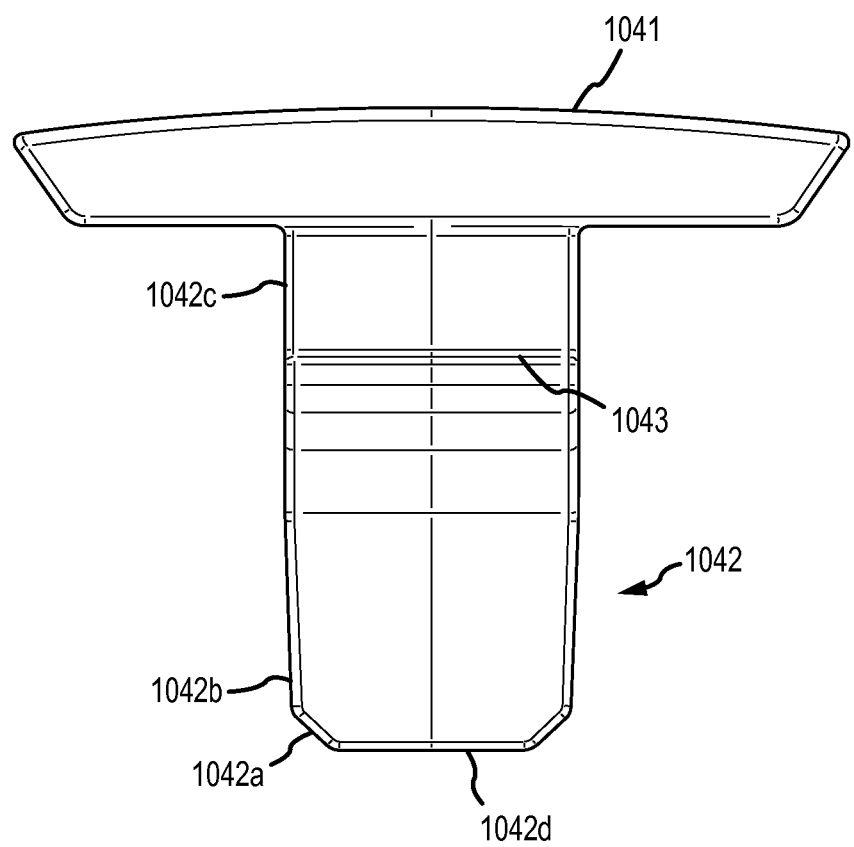
FIG. 8 is a front view of an insert according to an embodiment.
Figure 9:
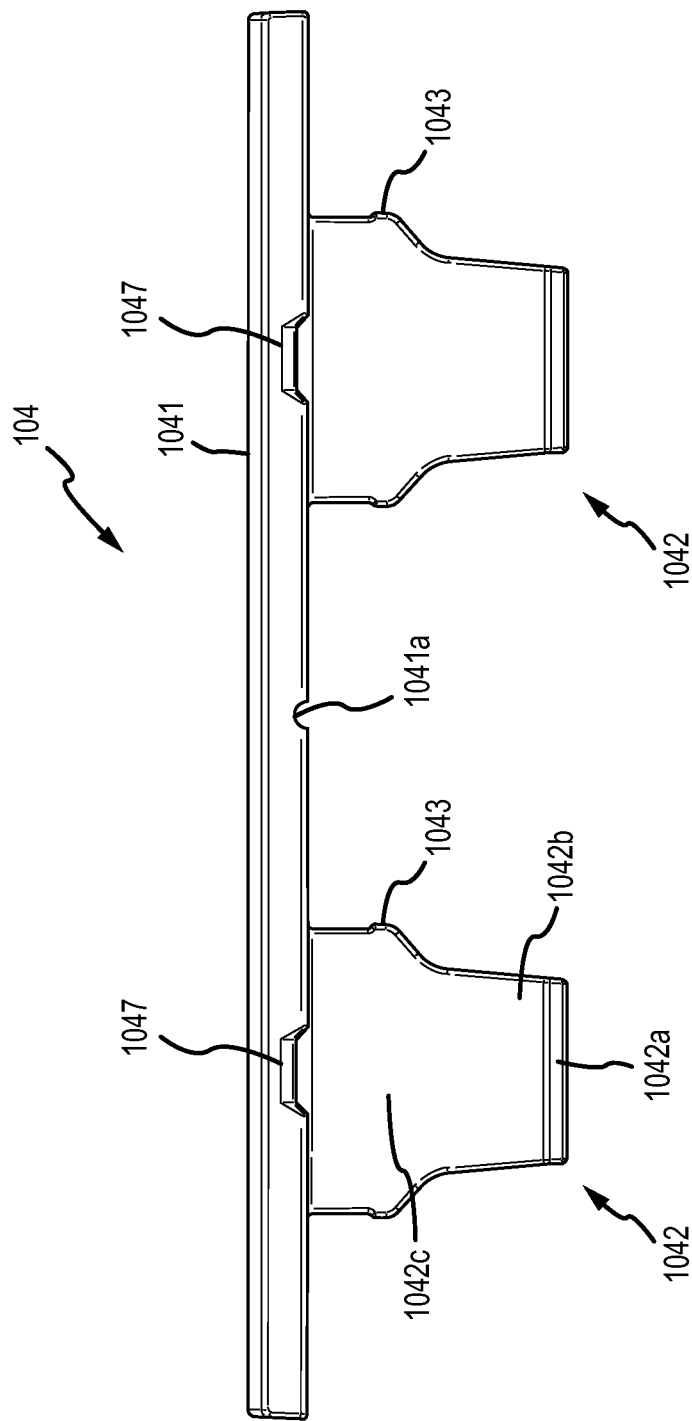
FIG. 9 is a side view of an insert according to an embodiment.

With reference now to FIGS. 7-9, the cover kit 100 has an insert 104. The insert 104 has an insert body 1041 and a plug 1042. The insert body 1041 is shaped to nestle within the longitudinal recess 1030 of the base 102, and the plug 1042 has a prong engagement surface 1042c shaped to engage a plug engagement wall 1022c of the engagement prong 1022. The plug 1042 is shaped to apply a force on the engagement prong 1022 when the cover kit 100 is assembled, specifically to cause the engagement prong 1022 to expand into a slot engagement configuration. The plug 1042 may have a lower prong engagement surface 1042b and an upper prong engagement surface 1042c to facilitate insertion of the plug 1042 into the socket 1021.

Figure 2A:
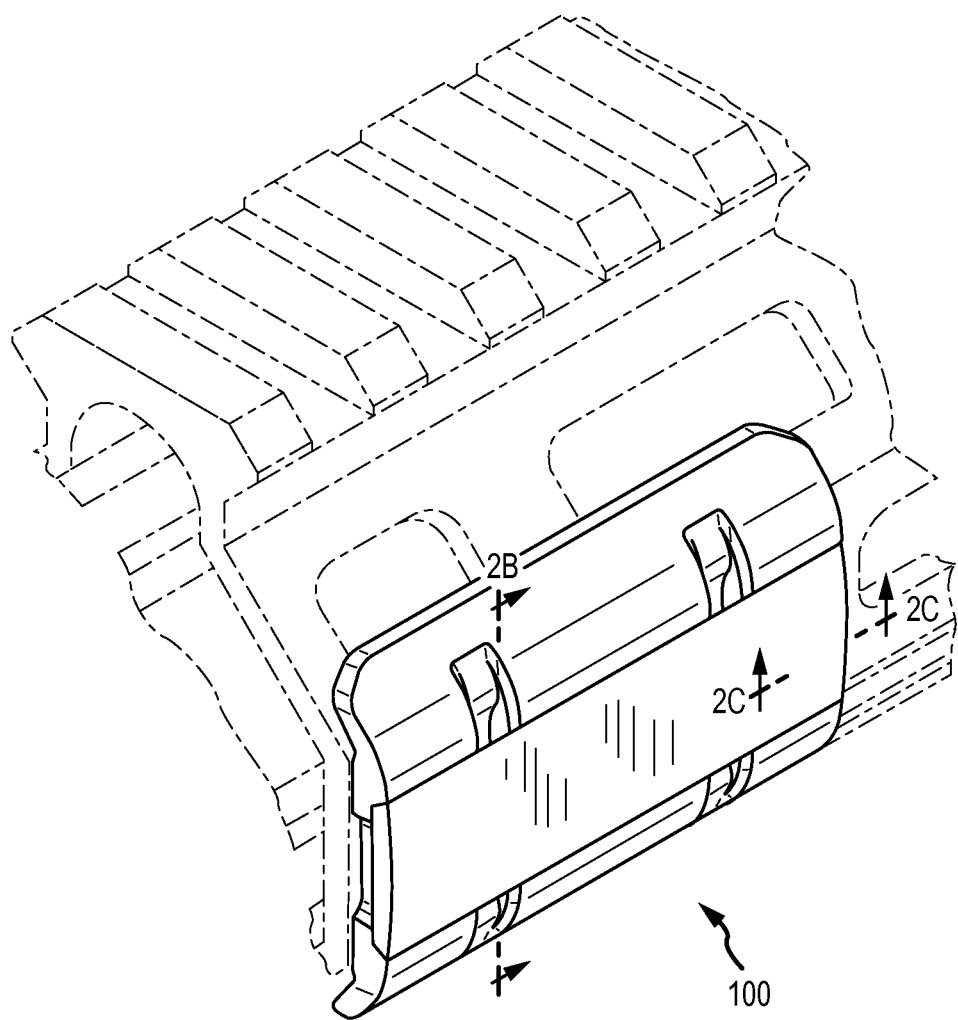
FIG. 2A is an isometric view of a cover kit assembled on a handguard.
Figure 2B:
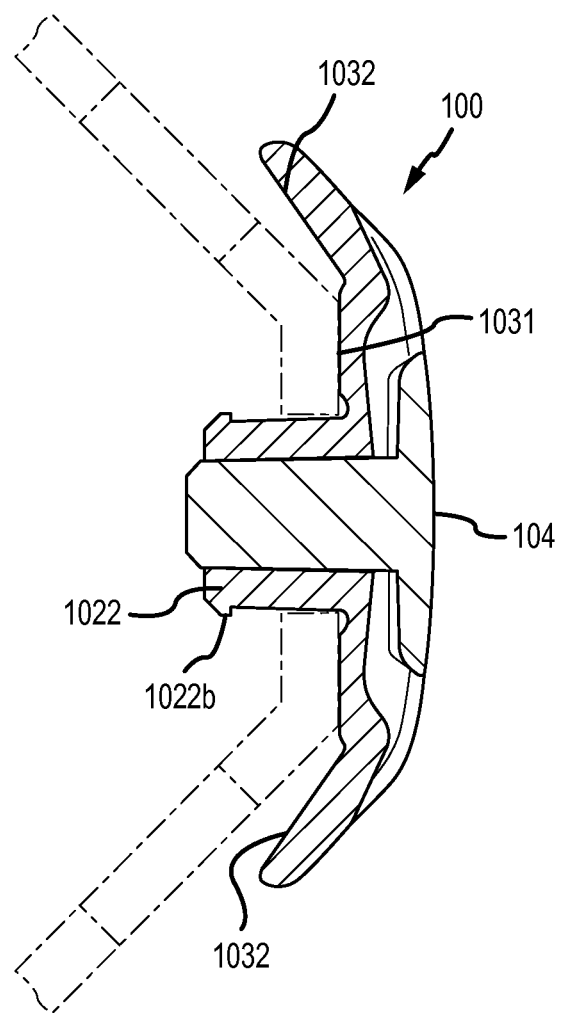
FIG. 2B is a section view of the cover kit in FIG. 2A.
Figure 2C:
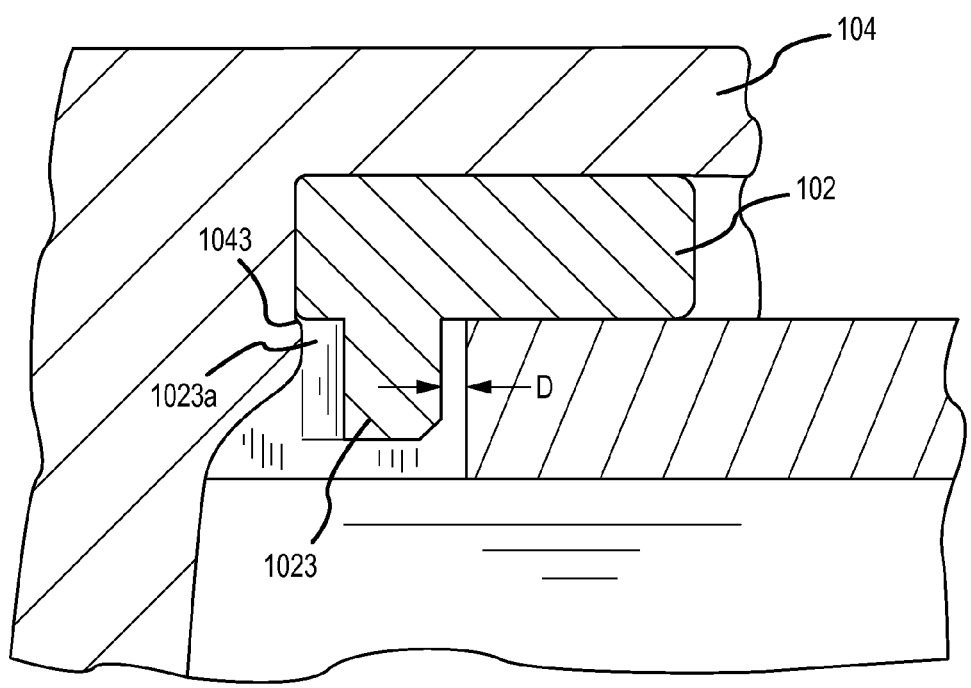
FIG. 2C is another section view of the cover kit in FIG. 2A.

Specifically, and referencing FIGS. 2, 5, and 8 together, the plug 1042 has an interference fit d with the engagement prong 1022 such that as the plug 1042 is inserted into the socket 1021, the lower engagement surface 1042b initially causes the engagement prong 1022 to slightly expand downward (e.g. into the handguard enclosure). Upon further insertion, the upper engagement surface 1042c then causes the engagement prong 1022 to expand outward in a more directed manner, or away from the longitudinal axis or plane of the base 102. Further, because of the radius R of the handguard engagement surface 1022d, the distal portion of the engagement prong 1022 is more easily biased outward.

Upon complete insertion of the plug 1042, the engagement prong 1022 may be flexed such that the handguard engagement surface 1022d is further from the longitudinal plane than a wall of the slot. It is this configuration that prevents the base 102 and cover kit 100 from disengaging from the handguard.

In some embodiments, the plug 1042 may have a plug lead-in 1042a to facilitate location of the plug 1042 relative to the socket 1021. The base 102 may likewise have a lead-in 1033 (see FIG. 2) to provide a locating feature for finding a through passage of the socket 1021.

Further, as should be apparent from viewing the lower prong engagement surface 1042b in FIG. 8, the plug 1042 may be shaped to apply a downward transverse force on the engagement prong 1022 during the initial stages of travel into the socket 1021. It should also be understood that the plug 1042 can be shaped to apply a longitudinal (as opposed to transverse) downward force on the engagement prong 1022 by, for example, changing the orientation of the lower prong engagement surface 1042b to be perpendicular to the orientation shown.

In some embodiments, the insert 104 comprises a second plug 1042 and a thin material region 1041a in the insert body 1042, the thin material region 1041a shaped to facilitate separating the insert 104 into two inserts 104, each having a single plug 1042.

In some embodiments, the plug 1042 further includes a ledge flange 1043 shaped to engage a socket ledge 1023 in the socket 1021, with the ledge flange 1043 not parallel to the prong engagement surface 1042b, 1042c of the plug 1042. In some embodiments, the ledge flange 1043 is perpendicular to at least a portion of the prong engagement surface 1042b, 1042c. The ledge flange 1043 may be perpendicular to an upper prong engagement surface 1042c. In some embodiments, the ledge flange 1043 may be shaped to apply a longitudinal force on the socket ledge 1023. In some embodiments, the ledge flange 1043 may be shaped to apply an upward longitudinal force on the socket ledge 1023.

In some embodiments (see, e.g., FIG. 2) an interior region of the plug 1042 extends through a through passage of the socket 1021 when the cover kit 100 is assembled, such that a distal region 1042d of the plug 1042 is not within the through passage of the socket 1021. In other words, the distal region 1042d may extend into an interior of the handguard while the insert body 1041 remains external of the base 102.

In some embodiments, and as seen most clearly in FIG. 7, the plug 1042 may have a hollowed portion 1042e. While those skilled in the art may understand that the hollowed portion 1042e provides for a lighter weight cover 100, due to less material, the hollowed portion 1042e also provides space for contaminants to collect without affecting the function of the cover 100.

The foregoing description of the cover kit 100 has generally included merely a description of one component even where multiple may be present. For example, the cover kit 100 may include a plurality of one or more of plugs 104, sockets 1021, engagement prongs 1022, grooves 1041a, etc. That is, the cover kit 100 may be configured to span a number of slots on a weapon handguard.

Figure 10:
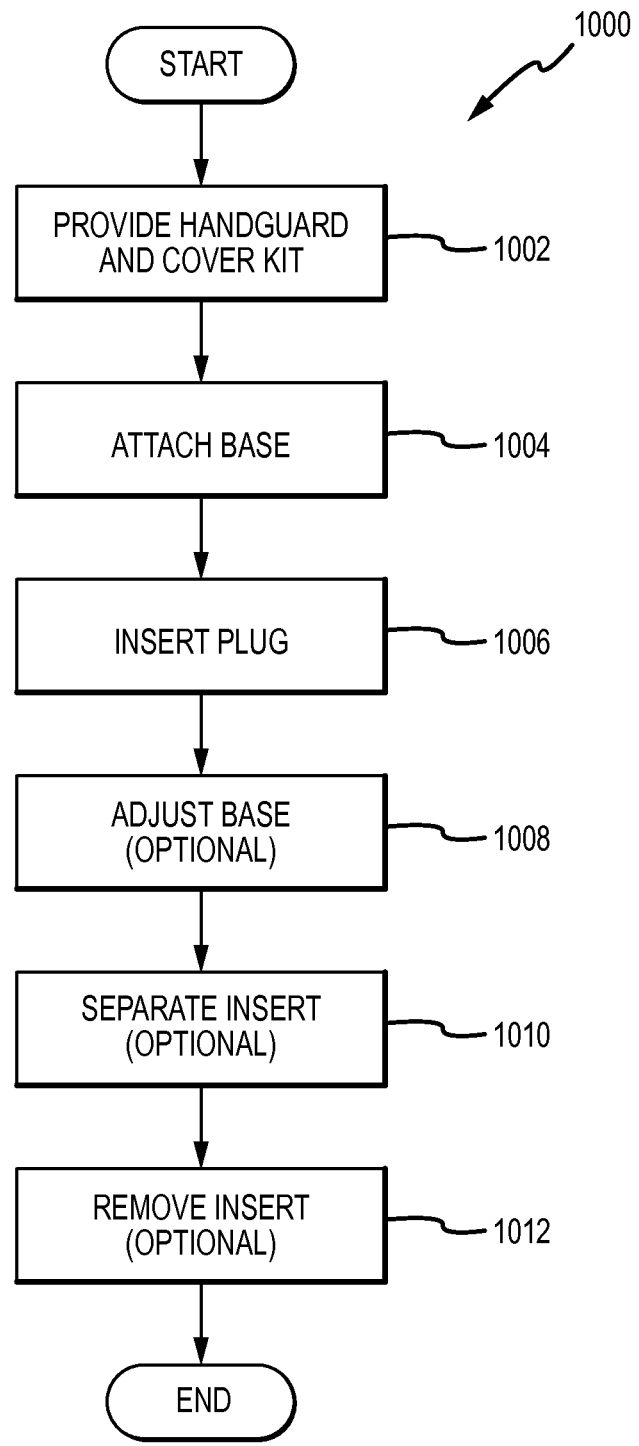
FIG. 10 is a flowchart of a method according to an embodiment.

Turning now to FIG. 10, a method 1000 of protecting a user's appendages when firing a weapon is now discussed. The method 1000 includes providing 1002 a weapon handguard and cover kit, attaching 1004 a base to the handguard, and inserting 1006 a plug into a socket of the base.

Providing 1002 comprises providing a weapon handguard and a cover kit, wherein the cover kit has a base and an insert. The base has a longitudinal axis, an upright axis, a transverse axis, and a socket having an engagement prong, while the insert has a plug, and the insert is made of a material that is equally flexible or less flexible than the base.

Attaching 1004 the base to a handguard includes inserting the engagement prong into a slot of the handguard.

Inserting the plug 1006 causes the plug to preclude the engagement prong from disengaging from the slot, and thereby prevents removal of the cover kit from the handguard until the plug is removed from the socket. The method 1000 may be accomplished using the cover kit assembly 100 and a weapon handguard previously described with reference to FIGS. 1-9.

The method 1000 may include adjusting 1008 the base to provide a heat dissipation effect, such that at least one of a plurality of handguard abutting surfaces in the base body firmly abut an exterior surface of the handguard while maintaining a separation between at least one of the plurality of handguard abutting surfaces and the exterior surface of the handguard.

The method 1000 may include separating 1010 the insert into two inserts by bending the insert at a thin material region in the insert body.

The method 1000 may further include removing 1012 the insert from the base by inserting a removal tool into a gap between the insert and a recess in the base and prying the insert from the base.

In conclusion, the present invention provides, among other things, a system and method for protecting a user's appendages when firing a weapon. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A cover kit for a firearm handguard having an elongated slot, the kit comprising:
    a base, the base comprising a longitudinal axis, an upright axis, a transverse axis, a socket, an exterior surface, and an interior surface, the socket comprising a movable engagement prong shaped to engage a straight wall surface of the elongated slot and an inwardly-projecting socket ledge having a curved surface shaped to engage a curved wall surface of the elongated slot to limit longitudinal movement relative to the elongated slot; and
    an insert, the insert comprising an insert body and a plug, the insert body shaped to abut the exterior surface of the base, the plug having a prong engagement surface shaped to engage the engagement prong, the plug further shaped to apply a force on the engagement prong such that a distal portion of the engagement prong is displaced more-than a proximal portion of the engagement prong when the plug is inserted in the socket, to prevent the base from disengaging from the elongated slot.

2. The cover kit of claim 1, wherein:
the plug is shaped to apply at least one of a downward transverse force or a downward longitudinal force on the distal portion of the engagement prong.

3. The cover kit of claim 1, wherein:
the interior surface of the base comprises a plurality of handguard abutting surfaces movable relative to one another.

4. The cover kit of claim 3, wherein:
the base is a unitary base made of a material that is at least as flexible as the insert; and
the plurality of handguard abutting surfaces comprise a first handguard abutting surface in a transverse plane, a second handguard abutting surface angled relative to the first handguard abutting surface, and a third handguard abutting surface opposing the second handguard abutting surface; wherein
notched material regions join the second and third handguard abutting surfaces to the first handguard abutting surface.

5. The cover kit of claim 1, wherein:
the engagement prong flexes outward when the plug is inserted into the socket.

6. The cover kit of claim 1, wherein:
the insert comprises a second plug and a thin material region in the insert body, the thin material region shaped to facilitate separating the insert into two inserts.

7. The cover kit of claim 1, wherein:
the base comprises a support for a removal tool.

8. The cover kit of claim 7, wherein:
the support comprises a recess shaped to provide a gap between a portion of the exterior surface of the base and a portion of an interior surface of the insert body when the base and the insert are assembled; and
at least a portion of the gap is upright of the engagement prong.

9. The cover kit of claim 1, wherein:
the engagement prong has a curved handguard engagement surface and an angled plug engagement wall; and
the plug is shaped to apply a substantially downward force followed by a substantially horizontal force on the plug engagement wall as the plug is inserted into the socket.

10. The cover kit of claim 1, further comprising:
a notched material region joining the engagement prong to a body of the base.

11. The cover kit of claim 1, wherein:
the engagement prong further comprises a prong flange shaped to prevent the base from disengaging from the handguard;
the plug further comprises a ledge flange shaped to engage the socket ledge in the socket, the ledge flange not parallel to the prong engagement surface of the plug.

12. The cover kit of claim 11, wherein:
the socket ledge is not parallel to the prong flange of the base.

13. The cover kit of claim 1, wherein:
an interior region of the plug extends through a through passage of the socket when the cover kit is assembled such that a distal region of the plug and a proximal region of the plug are not within the through passage of the socket.

14. The cover kit of claim 1, wherein:
the base is made of a flexible resilient material.

15. The cover kit of claim 1, wherein:
the base comprises a longitudinal recess; and
the insert is shaped to nestle within the longitudinal recess.

16. The cover assembly of claim 1, wherein:
the base is made of a flexible resilient material; and
the opposing engagement prongs are resiliently movable between the free configuration and the handguard engagement configuration.

17. A method of protecting a user's appendages when firing a weapon,
the method comprising:
providing a weapon handguard and a cover kit, the cover kit having a base and an insert, the base comprising a longitudinal axis, an upright axis, a transverse axis, and a socket having an engagement prong, the insert comprising a plurality of plugs, the insert made of a material that is as flexible or less flexible than the base;
separating the insert into two inserts, each insert having at least one plug, by bending the insert at a thin material region in a body of the insert;
attaching the base to a handguard by inserting the engagement prong into a slot of the handguard; and
inserting the plug into the socket; wherein
inserting the plug causes the plug to preclude the engagement prong from disengaging from the slot, and thereby prevents removal of the cover kit from the handguard until the plug is removed from the socket.

18. The method of claim 17, wherein:
inserting the plug further causes a handguard engagement surface of the engagement prong to engage a wall of the handguard slot.

19. The method of claim 17, further comprising:
adjusting the base such that at least one of a plurality of handguard abutting surfaces in the base body abuts an exterior surface of the handguard.

20. The method of claim 17, further comprising:
removing the insert from the base by inserting a removal tool into a gap between the insert and a recess in the base; and
prying the insert from the base.

21. The method of claim 17, further comprising:
causing a ledge flange in the plug to engage a socket ledge in the socket, the socket ledge skewed relative to the prong ledge.

22. A cover kit for a firearm handguard having an elongated slot, the elongated slot having a first pair of opposing walls and a second pair of opposing walls, the second pair of opposing walls parallel to a longitudinal axis of the elongated slot, the kit comprising:
a base, the base comprising a base body having a longitudinal axis and a transverse axis, and a socket shaped to interface with the elongated slot, the socket comprising two opposing movable engagement prongs shaped to engage the second pair of opposing walls of the elongated slot and at least one socket ledge projecting inwardly of the base to limit longitudinal movement of the base relative to the elongated slot, each of the two opposing movable engagement prongs comprising a distal portion that is distal from the base body and a proximal portion that is proximal to the base body; and
an insert, the insert comprising an insert body and a plug, the plug shaped to transversely displace the distal portion of each of the two opposing engagement prongs more than the proximal portion of the each of the two opposing movable engagement prongs when the plug is inserted in the socket.

23. A cover kit for a firearm handguard having an elongated slot, the kit comprising:
a base, the base comprising a socket, the socket comprising a movable engagement prong shaped to engage a straight wall surface of the elongated slot; and
an insert, the insert comprising an insert body and a plug, the insert body shaped to abut the exterior surface of the base, the plug having a prong engagement surface shaped to engage the engagement prong, the plug further shaped to apply a force on the engagement prong such that a distal portion of the engagement prong is displaced more-than a proximal portion of the engagement prong when the plug is inserted in the socket; wherein
the insert comprises a second plug and a thin material region in the insert body, the thin material region shaped to facilitate separating the insert into two inserts.

* * * * *